(12) United States Patent
Mevius

(10) Patent No.: US 9,062,781 B2
(45) Date of Patent: Jun. 23, 2015

(54) SEAL DISK ASSEMBLY FOR A FLUID REGULATOR

(75) Inventor: Jason S. Mevius, Edwardsville, IL (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 103 days.

(21) Appl. No.: 13/618,013

(22) Filed: Sep. 14, 2012

(65) Prior Publication Data

US 2014/0076426 A1 Mar. 20, 2014

(51) Int. Cl.
*F16K 31/12* (2006.01)
*F16K 1/36* (2006.01)
*F16K 1/46* (2006.01)
*F16J 15/06* (2006.01)

(52) U.S. Cl.
CPC ... *F16K 1/36* (2013.01); *F16K 1/46* (2013.01); *F16J 15/062* (2013.01)

(58) Field of Classification Search
CPC ............. F16K 1/34; F16K 1/46; F16K 25/00
USPC ...................... 137/505.47, 505.6, 116.5, 494;
251/359, 357, 356, 334, 333, 332;
277/644, 647
See application file for complete search history.

(56) References Cited

U.S. PATENT DOCUMENTS

| | | | | |
|---|---|---|---|---|
| 61,414 A * | 1/1867 | Frink | | 251/86 |
| 177,925 A * | 5/1876 | Crane | | 251/210 |
| 320,422 A * | 6/1885 | Warren | | 217/101 |
| 568,719 A * | 9/1896 | Frisbie | | 251/120 |
| 874,652 A * | 12/1907 | Bailey | | 137/516.29 |
| 1,004,320 A * | 9/1911 | Webster | | 137/329.04 |
| 1,526,248 A * | 2/1925 | Small | | 251/88 |
| 1,786,596 A * | 12/1930 | Bissell | | 251/357 |
| 2,654,561 A * | 10/1953 | Trefil | | 251/335.2 |
| 2,920,862 A * | 1/1960 | Beard | | 251/357 |
| 3,314,448 A | 4/1967 | Wolff et al. | | |
| 5,402,820 A * | 4/1995 | Duffy et al. | | 137/505.36 |
| 6,213,413 B1* | 4/2001 | Kojima et al. | | 239/533.11 |
| 7,513,483 B1 | 4/2009 | Blume | | |
| 7,909,057 B1 | 3/2011 | Vicars | | |
| 2009/0261281 A1 | 10/2009 | Mevius et al. | | |
| 2012/0132839 A1 | 5/2012 | Moren | | |

FOREIGN PATENT DOCUMENTS

DE 94 16 196 U1 12/1994
GB 1 158 000 A 7/1969

OTHER PUBLICATIONS

"Arch", Merriam-Webster, May 2014.*
"Curve", Merriam-Webster, May 2014.*
International Search Report for PCT/US 2013/059353, mailed Dec. 10, 2013.
Written Opinion for PCT/US2013/059353, mailed Dec. 10, 2013.

* cited by examiner

*Primary Examiner* — Kevin Murphy
*Assistant Examiner* — R. K. Arundale
(74) *Attorney, Agent, or Firm* — Marshall, Gerstein & Borun LLP

(57) ABSTRACT

A seal disk assembly for a flow control valve includes a disk housing having a seating portion with a concave arched profile and a seal disk having a mounting portion that is received in the disk housing. The seal disk has a seal surface for engaging a valve seat.

7 Claims, 4 Drawing Sheets

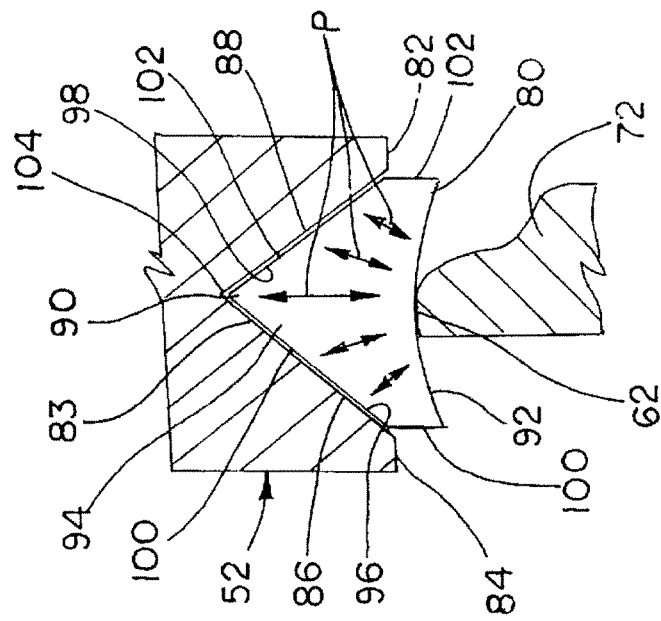
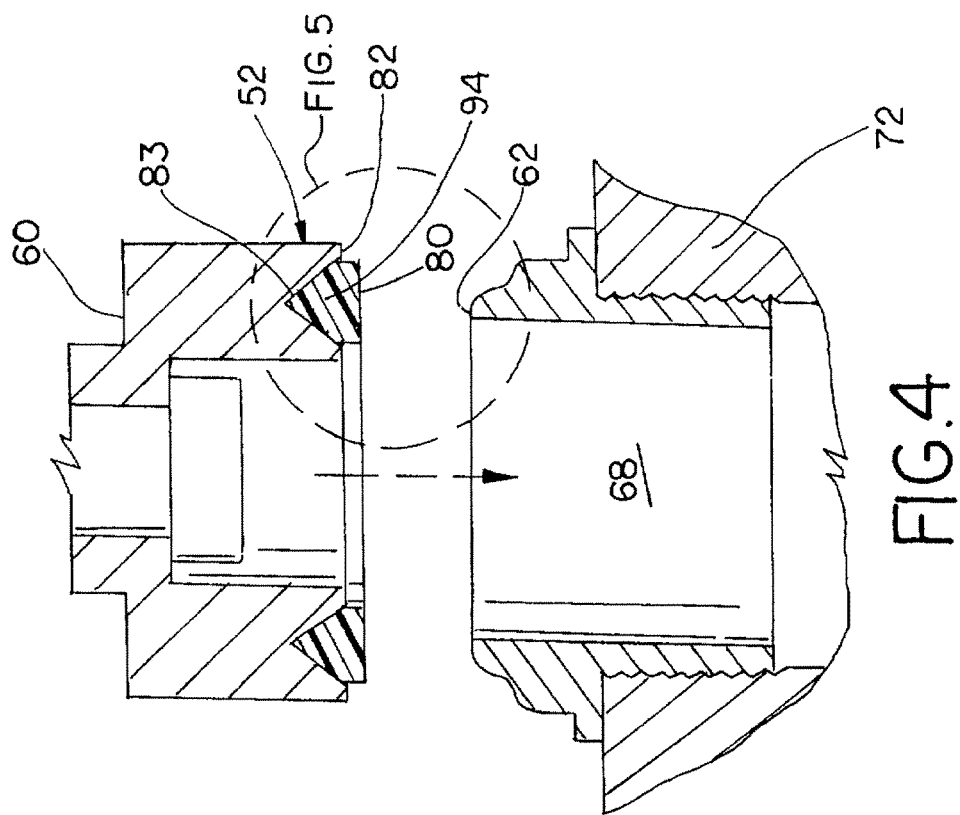

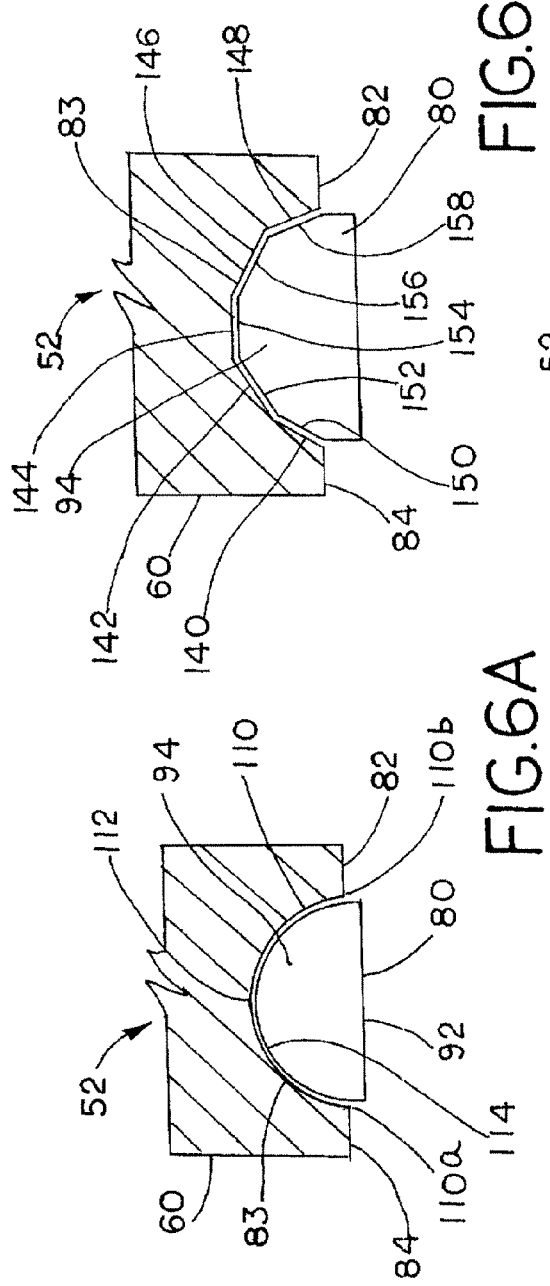
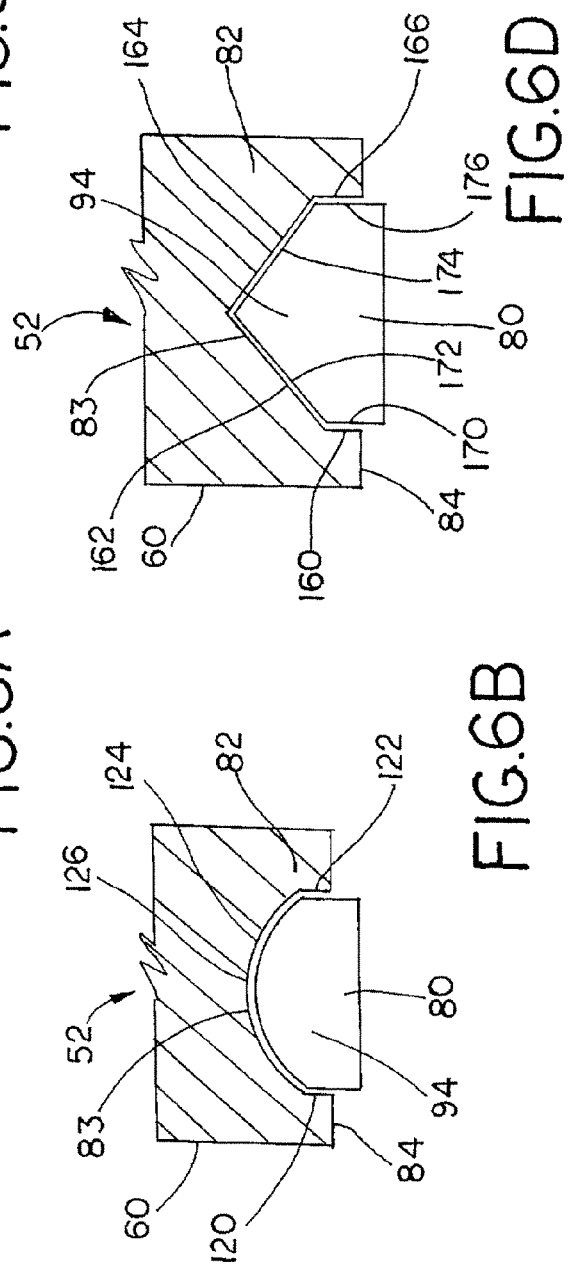

SEAL DISK ASSEMBLY FOR A FLUID REGULATOR

FIELD OF THE INVENTION

The present invention relates generally to a seal disk assembly for a fluid regulator or other type of flow control valve.

BACKGROUND

The pressure at which typical gas distribution systems supply gas may vary according to a number of factors. These factors may include, for example, the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of the end-user appliance. Therefore, process fluid regulators are implemented in these distribution systems in order to ensure that the delivered gas meets the requirements of the end-user facilities. Process fluid regulators are also used to regulate the delivery of liquids to achieve similar functionalities.

A common process fluid regulator includes a regulator body, a control element, and an actuator. The regulator body defines a fluid flow path, a fluid inlet, and a fluid outlet. An orifice is operatively disposed in the body along the fluid flow path between the fluid inlet and the fluid outlet. The fluid flow path extends from the fluid inlet, through the orifice, and to the fluid outlet. The control element shifts to regulate the flow of fluid along the fluid flow path through the orifice. The control element sealingly engages a valve seat defined by the orifice in a closed position, and is spaced away from the valve seat in an open position. In a manner well understood in the art, the actuator is operatively connected to the regulator body and the control element to control the position of the control element relative to the orifice in response to pressure changes in the fluid flow path to maintain a the process fluid pressure within a preselected range, for example, at the fluid outlet.

FIG. 1 shows an isolated and enlarged detail of a typical control element 10 and an orifice 12 in a process fluid regulator. The orifice 12 typically has the form of a circular tube and is secured to a regulator body 14, for example, with outer threads 16 that engage complementary inner threads 17 in the regulator body 14, and surrounds and forms an aperture 18 through which fluid must pass. A valve seat 20 is defined along the upper edge or annular lip of the orifice 12. The control element 10 carries a seal disk assembly, including a seal disk 22 made of resilient sealing material, such as rubber or the like, that is carried in a disk housing 24, which may be, for example, defined by a bottom end of the control element 10. (Directional modifiers, such as up, down, left, and right, are used solely for ease of reference relative to the drawings and do not otherwise limit the scope of the disclosure.) The seal disk 22 includes a mounting portion 25, which preferably has a circular ring shape defining a central aperture. The seal disk 22 may optionally include a central web or disk extending across the central aperture. In the exemplary arrangements shown in the figures, however, the seal disk 22 does not include a central web. The disk housing 24 includes a seating portion 27 in the form of a groove aligned opposite the valve seat 20. The seating portion 27 has a flat rectangular profile. The mounting portion 25 of the seal disk 22 also has a flat rectangular cross section that is complementary to the seating portion 27. The mounting portion 25 fits tightly into the seating portion 27 such that the seal disk 22 is arranged to sealingly engage the valve seat 20 when the control element 10 is moved to a lockup position, i.e., the extreme or maximum closed position of the control element 10 that completely stops fluid flow through the aperture 18 and thus the regulator body.

As best seen in the enlarged detail of FIG. 2, the seating portion 27 of the disk housing 24 has a rectangular cross-section formed by a first side wall 26, a second side wall 28, and a back wall 30. Each of the first and second side walls 26, 28 extends from a first end at an end face 32 of the disk housing 24 to a second end spaced inwardly from the end face 32. The back wall 30 extends from the second end of the first side wall 26 to the second end of the second side wall 28. The side walls 26, 28 are perpendicular to the end face 32, and the back wall 30 is perpendicular to each of the side walls 26, 28. The mounting portion 27 of the seal disk 22 has a similar rectangular profile that fits into the disk housing 24. The seal disk 22 also includes a seal surface 34 that sealingly engages the valve seat 20. The seal surface 34 has a flat face. The mounting portion 27 is complementary to the seating portion 27, having a flat end wall 36 connected to the flat seal surface 34 by side walls 38 and 40. The side walls 38, 40 and end wall 36 of the mounting portion 25 fit against the side walls 26, 28, and the back wall 30 of the seating portion 27, respectively.

As the valve seat 20 compresses and deforms the mounting portion 25 of the seal disk 22 into the seating portion 27 in the lockup position, the seal disk 22 does not remain flat. Rather, as shown graphically by the arrows P, the seal disk 22 deforms unevenly across the rectangular cross section profile of the mounting portion 25 within the seating portion 27. The uneven or non-uniform compression across the profile of the mounting portion 25 may cause the actuation forces necessary to achieve the lock-up position to be higher than necessary.

SUMMARY

A seal disk assembly for a flow control valve, such as a fluid regulator, according to some aspects of the disclosure includes a disk housing having a seating portion with a concave arched profile and a seal disk with a mounting portion that is received in the seating portion. The seal disk has a seal surface for engaging a valve seat. The concave arched profile of the seating portion in some arrangements may provide more even compression across the profile of the seal disk than the flat or rectangular profile of the prior art.

According to one exemplary aspect, a seal disk assembly according to the teachings of the present disclosure is disposed in a flow control valve including a valve body and a flow control member. The seal disk assembly includes a disk housing, the disk housing having a seating portion, a seal disk mounted to the disk housing, the seal disk having a mounting portion and a seal surface, and a valve seat arranged to compress the seal disk in a closed position of the flow control member. The seating portion of the disk housing has a concave arched profile, the mounting portion of the seal disk has a profile disposed in the seating portion of the disk housing, and the valve seat compresses the seal disk uniformly across the profile of the seal disk.

According to another exemplary aspect, a seal disk assembly for a control element of a flow control valve includes a disk housing and a seal disk. The disk housing is carried by the control element and has a seating portion. The seating portion has a concave arched profile. The seal disk is sized for mounting to the disk housing. The seal disk has a mounting portion and a seal surface. The mounting portion of the seal disk has a profile corresponding to the concave arched profile of the seating portion of the disk housing.

According to another exemplary aspect, a fluid regulator includes a regulator body defining a flow passage extending from an inlet to an outlet, an orifice disposed in the fluid flow path, the orifice defining a valve seat, and a control element arranged to shift between an open position that allows fluid flow through the orifice and a closed position against the valve seat that prevents fluid flow through the orifice. A disk housing is carried by the control element and has a seating portion having a concave arched profile. A seal disk is sized for mounting to the disk housing and has a mounting portion and a seal surface. The seal surface of the seal disk is arranged to sealingly engage the valve seat when the control element is in the closed position. The mounting portion of the seal disk has a profile corresponding to the concave arched profile of the seating portion of the disk housing.

In further accordance with any one or more of the foregoing exemplary aspects, a seal disk assembly and/or a fluid regulator further optionally may include any one or more of the following preferred forms.

In some preferred forms, the concave arched profile has an inverted V-shaped profile including a first angled wall and a second angled wall. In other preferred forms, the concave arched profile has one or more of an arcuate wall section and a plurality of straight wall sections.

In some preferred forms, the mounting portion of the seal disk is complementary to the concave arched profile of the seating portion.

In some preferred forms, the seating portion forms a groove. The groove may be disposed in an end face of the control element. The groove may extend in a ring.

In some preferred forms, the seal disk is in the form of a ring.

In some preferred forms, the seal disk is formed of a resilient sealing material. The disk housing may be formed of a rigid material.

In some preferred forms, the seal disk is carried by the flow control member. The valve seat may be carried by the valve body.

In some preferred forms, the flow control valve is part of a fluid regulator, the valve body is a regulator body, and the valve seat is defined by an orifice.

In some preferred forms, the fluid regulator includes an actuator operatively coupled to the regulator body and the control element. The actuator may include an actuator housing, a diaphragm disposed inside the actuator housing, and a linkage operatively connecting the diaphragm to the control element. The diaphragm may be responsive to changes in fluid pressure at the outlet to shift the control element and maintain a preselected pressure range at the outlet.

Additional optional aspects and forms are disclosed, which may be arranged in any functionally appropriate manner, either alone or in any functionally viable combination, consistent with the teachings of the disclosure. Other aspects and advantages will become apparent upon consideration of the following detailed description.

BRIEF DESCRIPTION OF THE DRAWINGS

FIG. 4 is an enlarged cross-sectional view of the valve trim taken at the circumscribed portion of FIG. 3 illustrating the exemplary seal disk assembly in greater detail.

FIG. 5 is an enlarged cross-sectional view taken at the circumscribed portion of FIG. 4 and illustrating the exemplary seal disk assembly in greater detail.

FIGS. 6A-6D are enlarged cross-sectional views taken at the circumscribed portion of FIG. 4 and illustrating in greater detail alternative exemplary forms of the seal disk assembly in accordance with the teachings of the present disclosure.

DETAILED DESCRIPTION

Figure 2:
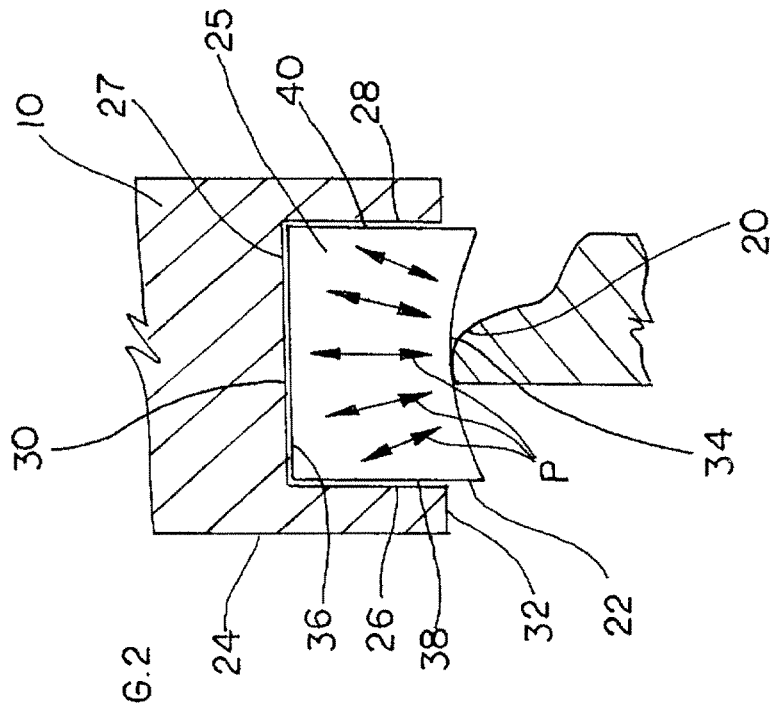
FIG. 2 is an enlarged cross-sectional view taken at the circumscribed portion of FIG. 1 and illustrating the conventional valve seal disk assembly in greater detail.
Figure 1:
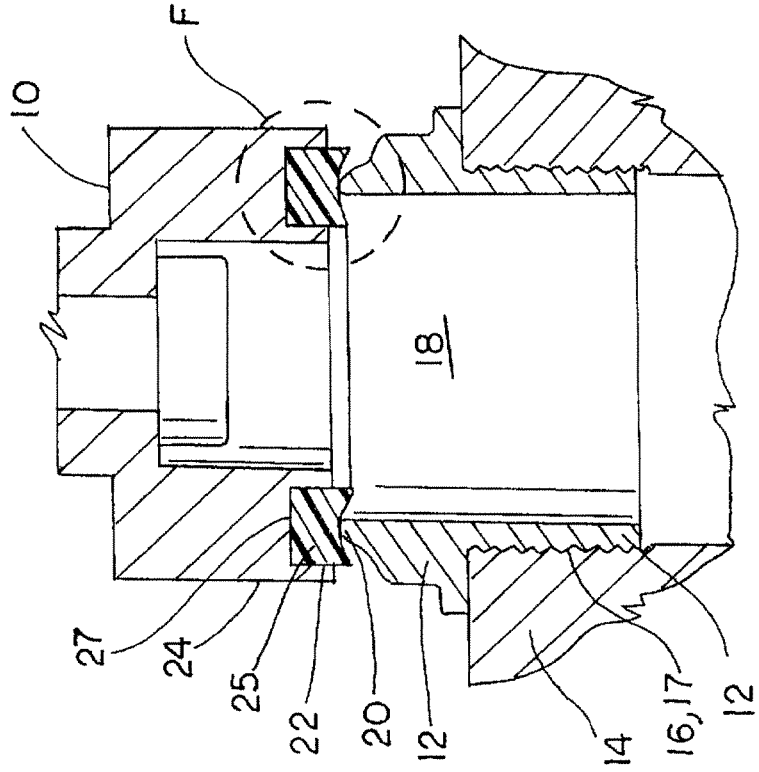
FIG. 1 is a cross-sectional view of portions of a typical valve trim.
Figure 3:
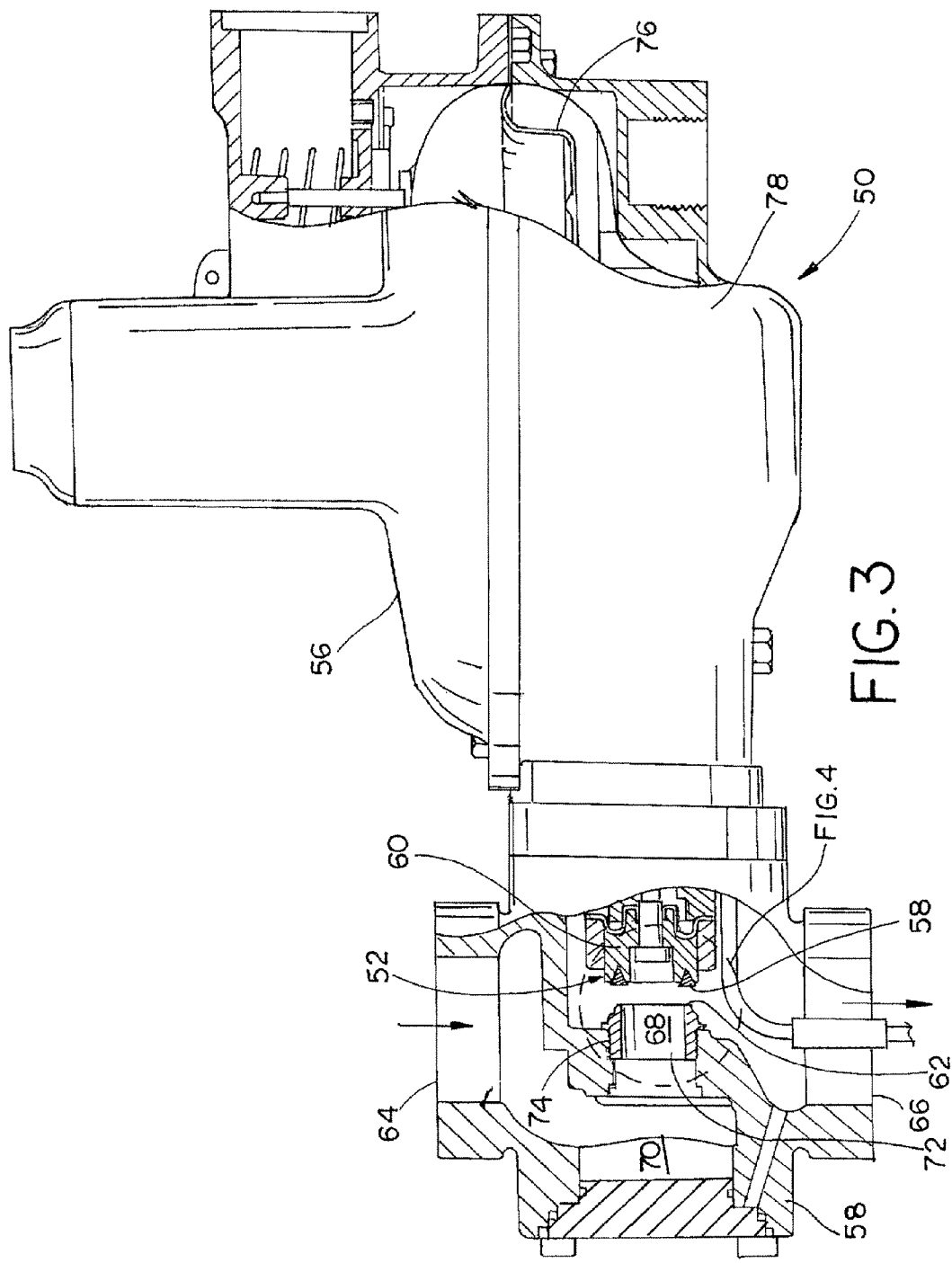
FIG. 3 is a partial cut-away side view of a fluid regulator with a valve trim including an exemplary seal disk assembly assembled in accordance with the teachings of the present disclosure.

In the exemplary arrangement of FIG. 3, a flow control valve, such as found in a fluid regulator 50, includes a seal disk assembly 52 according to the teachings of the present disclosure. The fluid regulator 50 may be a commonly known fluid regulator having a valve body, such as a regulator body 58, a flow control member, such as a control element 60, a valve seat 62, and an actuator 56. The actuator 56 is operatively connected to the regulator body 58 and the control element 60 to shift the control element 60 between an open position spaced from the valve seat 62 and a closed position engaged against the valve seat 62. The actuator 56 thereby regulates and/or maintains outlet fluid pressure from the regulator body 58 within a preselected set pressure range in a manner understood in the art. However, the seal disk assembly 52 is not limited to use with a fluid regulator, but rather may also be used in other types of flow control valves as will be apparent upon review of the description herein.

The regulator body 58 defines an inlet 64, an outlet 66, an aperture 68 between the inlet 64 and the outlet 66, and a fluid flow path 70 extending through the aperture 68 from the inlet 64 to the outlet 66. The valve seat 62 is defined by a rim of an orifice 72 surrounding the aperture 68. The orifice 72 preferably has a generally hollow cylindrical body and is secured to the regulator body 58, for example, by threads 74, to surround the aperture 68. Thus, the valve seat 62 may be circular. The control element 60 carries the seal disk assembly 52 and shifts between the closed position, which stops fluid flow through the aperture 68, and a fully open position, which allows a maximum fluid flow through the aperture 68.

The actuator 56 is arranged to shift the control element 60 between the closed position and the fully open position in response to changes in fluid pressure at the outlet 66. The actuator 56 in this exemplary arrangement is a diaphragm regulator, which includes a diaphragm 76 disposed inside an actuator housing 78 and operatively connected to the control element 56 by a linkage (not visible). The diaphragm 76 shifts in response to changes in outlet fluid pressure at the outlet 66 to shift the control element 60 and thereby maintain the preselected set pressure range at the outlet 66. The components and functioning of the actuator 56 are well understood in the art, and therefore further detailed description of the components and functionality thereof is not presented herein.

Turning now to the enlarged view of FIG. 4, the seal disk assembly 52 includes a seal disk 80 made of resilient sealing material, such as rubber or neoprene, that is carried in a disk housing 82 made of a rigid material, such as steel or hard plastic. The disk housing 82 is carried by the control element 60; however, in other arrangements, the disk housing 82 may be carried by the orifice 72 and the valve seat 62 may be carried by the control element 60. A seating portion 83 is formed in an end face 84 of the disk housing 82, and preferably forms a ring-shaped circular groove disposed at the sealing end of the control element 60. The disk housing 82 may be integral with the control element 60 or a separate component that is removably coupled to the control element 60. The disk housing 82 is aligned opposite the valve seat 62. A mounting portion 94 of the seal disk 80 fits tightly into the seating portion 83. The seal disk 80 sealingly engages the valve seat 62 when the control element 60 is moved to a lock-up position, i.e., the closed position of the control element 10 that completely stops fluid flow through the aperture 68 and thus the valve.

As best seen in the enlarged detail of FIG. 5, the seating portion 83 of the disk housing 82 has a concave arched profile rather than a rectangular profile as in the prior art. The concave arched profile in this exemplary arrangement is a V-shaped profile formed by a first wall 86 and a second wall 88. The first wall 86 is disposed radially inwardly from the second wall 88. The first wall 86 has a first end at the end face 84 and a second end spaced inwardly from the end face 84. Similarly, the second wall 88 has a first end at the end face 84 and a second end spaced inwardly from the end face 84. The first ends of the first and second walls 86, 88 are spaced apart radially. The second ends of the first and second walls 86, 88 are coterminous at a peak 90. The first wall 86 forms an inverted frustoconical ring, and the second wall 88 forms an upright frustoconical ring (as illustrated in the drawings). Thus, the seating portion 83 forms an inverted V-shaped groove extending in a ring around the sealing end of the control element 60 opposite the valve seat 62.

The sealing disk 80 has a seal surface 92 and the mounting portion 94. The seal surface 92 sealingly engages against the valve seat 62. The seal surface 92 is flat; however, in other arrangements, the seal surface 92 may have an indentation to receive the valve seat 62 or other shapes arranged for sealing engagement against the valve seat 62. The mounting portion 94 seats into the seating portion 83 of the disk housing 82. The mounting portion 94 corresponds to the shape of the seating portion 83, such as by having a profile that is complementary to the concave arched profile of the seating portion 83. Thus, the mounting portion 94 has an inverted V-shaped profile and includes a first angled wall 96 and a second angled wall 98. In some arrangements, the sealing disk 80 forms a ring, wherein the profile of the mounting portion 94 extends around a circle, the first angled wall 96 defines an inverted frustoconical section and the second angled wall 98 defining an upright frustoconical section. The first angled wall 96 is disposed radially inwardly from the second angled wall 98. An inner side wall 100 joins an inner edge of the seal surface 92 to a first end of the first angled wall 96. An outer side wall 102 joins an outer edge of the seal surface 92 to a first end of the second angled wall 98. The upper edges of the first and second angled walls 98 are coterminous at an upper peak 104.

In the assembled position shown in FIGS. 3-5, the first angled wall 96 of the mounting portion 94 seats against the first wall 86 of the seating portion 83. The second angled wall 98 of the mounting portion 94 seats against the second wall 88 of the seating portion 83. The inner and outer sidewalls 100, 102 extend outwardly from the disk housing 82. The seal surface 92 of the seal disk 80 is spaced outwardly from the end face 84 of the disk housing 82.

The concave arched profile of the seating portion 83 of the disk housing 82 is shaped to minimize compression of the seal disk 80 during lockup of the fluid regulator 50. As most clearly seen in FIG. 5, the area of the seal surface 92 that engages the valve seat 62 is significantly smaller than the total area of the seal surface 92 because the valve seat 62 is significantly narrower than the seal surface 92. The valve seat 62 is also narrower than the width of the seating portion 83. Therefore, as the valve seat 62 compresses against the seal surface 92, the mounting portion 94 deforms into the seating portion 83 in the lock-up position, and the seal disk 80 does not remain flat. However, unlike the prior art seal disk 22, as shown graphically by the arrows P, the valve seat 62 compresses the seal disk 80 uniformly across the profile of the mounting portion 94.

A few alternative exemplary concave arched profiles that may be used with the seal disk assembly 52 are shown in FIGS. 6A-6D, in which like structures are given the same reference numeral as before.

In FIG. 6A, the concave arched profile of the seating portion 83 is an arcuate profile defined by a single arcuate wall 110 forming a recessed groove into the end face 84 of the control element 60. The arcuate wall 110 has a first end 110*a* terminating at the end face 84, a second end 110*b* terminating at the end face 84 and spaced radially outwardly from the first end, and an apex 112 forming the deepest part of the profile of the seating portion 83. The mounting portion 94 of the seal disk 80 is likewise formed by a single arcuate wall 114 that is complementary to the arcuate wall 110 of the seating portion 83 such that the arcuate wall 114 of the mounting portion 94 seats against the arcuate wall 110 of the seating portion 83.

In FIG. 6B, the concave arched profile of the seating portion 83 has a first sidewall 120, a second sidewall 122, and an arcuate back wall 124. Each of the first and second sidewalls 120, 122 is straight and has a first end disposed at the end face 84 and extends perpendicular to the end face 84 to a second end recessed in the control element 60. The arcuate back wall 124 has a first end coterminous with the second end of the first side wall 120, a second end coterminous with the second end of the second side wall 122, and an apex 126 forming the deepest part of the profile of the disk housing 82. The mounting portion 94 of the seal disk 80 likewise has a profile with two side walls 128, 130, and an arcuate end wall 132 that are complementary to the concave arched profile of the disk housing 82. The arcuate end wall 132 and the side walls 128 and 130 of the mounting portion 94 seat against the arcuate back wall 124 and the side walls 120 and 122, respectively, of the seating portion 83.

In FIG. 6C, the concave arched profile of the seating portion 83 has a plurality of wall segments 140, 142, 144, 146, and 148, which together define the profile of the seating portion 83. Each of the wall segments 140-148 is a straight wall segment. Consequently, the wall segment 140 extends from the end face 84 to the wall segment 142, the wall segment 142 extends from the wall segment 140 to the wall segment 144, and the wall segment 144 extends from the wall segment 142 to the wall segment 146. Similarly, the wall segment 146 extends from the wall segment 144 to the wall segment 148, and the wall segment 148 extends from the wall segment 146 to the end face 84. The wall segment 140 is spaced radially inwardly from the wall segment 148 along the end face 84. The mounting portion 94 of the seal disk 80 likewise has a profile with wall segments 150, 152, 154, 156, and 158 that are complementary to and seat against the respective wall segments 140-148 of the seating portion 83.

In FIG. 6D, the concave arched profile of the seating portion 83 has a plurality of wall segments 160, 162, 164, and 166. Each wall segment 160-166 is a straight wall segment, wherein the wall segment 160 extends from the end face 84 to the wall segment 162, the wall segment 162 extends from the wall segment 160 to the wall segment 164, the wall segment 164 extends from the wall segment 162 to the wall segment 166, and the wall segment 166 extends from the wall segment 164 to the end face 84. The wall segment 160 is spaced radially inwardly from the wall segment 166 along the end face 84. Each of the wall segments 160 and 166 is perpendicular to the end face 84. The mounting portion 94 of the seal disk 80 likewise has a profile with wall segments 170, 172, 174, and 176 that are complementary to and seat against the respective wall segments 160-166 of the seating portion 83.

The concave arched profile of the seating portion 83 of the disk housing 82 is not limited to the exemplary V-shaped profile shown in FIGS. 3-5 or the alternative exemplary profiles shown in FIGS. 6A-6D. Rather, the concave arched profile of the seating portion 83 may be any profile of generally concave arched shape that provides uniform compression and/or deformation of the mounting portion 94 of the seal disk 82 as the valve seat 62 presses the seal disk 80 against and into the seating portion 83 of the disk housing 82. Numerous other concave arched profiles of the disk housing 82 are possible to provide for uniform compression and deformation across the profile of the seal disk 80, and the scope of the disclosure is not to be otherwise limited to the specific examples provided herein.

In some optional arrangements, the seal disk assembly 52 may be adapted for a seal disk 80 that seals to multiple orifices 72 of multiple different sizes. In such arrangement, the disk housing 82 may have a plurality of seating portions 83, such as a series of concentric grooves or rings, adapted to receive a plurality of corresponding mounting portions 94 arranged to fit into the different seating portions 83.

A seal disk assembly 52 according to the teachings of the present disclosure may, in some arrangements, improve the lockup performance of a fluid regulator, such as a gas regulator for use in residential, commercial, and/or industrial settings. The seal disk assembly 52 may be particularly advantageous where rubber is used as a valve seal, particularly in low-force lockup arrangements. For example, such a seal disk assembly in some arrangements may improve the flatness of a seal disk during lockup of the fluid regulator by providing substantially more uniform compression and/or deformation across the profile of the seal disk and/or the mounting portion than the flat rectangular profile of the mounting portion of the prior art seal disk assembly. Without being bound by theory, it is believed that changing the seating portion of the seal disk housing influences the final shape of the mounting portion when compressed during lockup of the fluid regulator. It is also believed that modifying the shape of the seating portion to mimic the distribution of compression forces across the profile of the mounting portion of the seal disk may, in some arrangements, result in a flatter final seal between the seal surface and the valve seat and reduce actuator forces needed to achieve lockup of the fluid regulator in comparison to the prior art. Such reduction may improve overall performance of the fluid regulator. Such improvements may also provide similar benefits to other types of flow control valves.

Each of the optional arrangements described herein may be arranged in any set of combinations or permutations sufficient to provide any combination of one or more functionalities suggested by the description provided herein. Further, it is understood that each of the features disclosed with respect to each exemplary arrangement may be combined in any functional combination, such as to provide any useful combination of functionalities as would be understood by a person of ordinary skill.

Numerous modifications to the exemplary seal disk assemblies disclosed herein will be apparent to those skilled in the art in view of the foregoing description. Accordingly, this description is to be construed as illustrative only and is presented for the purpose of enabling those skilled in the art to make and use the invention and to teach the preferred mode of carrying out same. The exclusive rights to all modifications within the scope of the disclosure and the appended claims are reserved.

I claim:

1. A fluid regulator, comprising:
   a regulator body defining a flow passage extending from an inlet to an outlet;
   an orifice disposed in the fluid flow path, the orifice defining a valve seat;
   a control element comprising a disk housing and arranged to shift between an open position that allows fluid flow through the orifice and a closed position against the valve seat that prevents fluid flow through the orifice;
   the disk housing having a seating portion having a concave profile;
   a seal disk sized for mounting to the disk housing, the seal disk having a mounting portion and a seal surface;
   the seal surface of the seal disk arranged to sealingly engage the valve seat when the control element is in the closed position; and
   the mounting portion of the seal disk having a profile corresponding to the concave profile of the seating portion of the disk housing;
   wherein the profile of the mounting portion of the seal disk is complementary to the concave profile of the disk housing; and
   wherein the concave profile comprises an inverted V-shaped profile including a first angled wall and a second angled wall.

2. The fluid regulator of claim 1, wherein the disk housing comprises a groove disposed in an end face of the control element, the groove extending in a ring about the end face.

3. The valve of claim 1, wherein the concave profile further comprises a plurality of straight wall sections.

4. The fluid regulator of claim 1, further comprising an actuator operatively coupled to the regulator body and the control element, wherein the actuator comprises:
   an actuator housing;
   a diaphragm disposed inside the actuator housing; and
   a linkage operatively connecting the diaphragm to the control element;
   wherein the diaphragm is responsive to changes in fluid pressure at the outlet to shift the control element and maintain a preselected pressure range at the outlet.

5. A seal disk assembly for a control element of a flow control valve, comprising:
   a disk housing carried by the control element, the disk housing having a seating portion having a concave profile;
   a seal disk sized for mounting to the disk housing, the seal disk having a mounting portion and a seal surface;
   the mounting portion of the seal disk having a profile corresponding to the concave profile of the seating portion of the disk housing;
   wherein the mounting portion of the seal disk is complementary to the concave profile of the seating portion of the disk housing; and
   wherein the concave profile comprises an inverted V-shaped profile including a first angled wall and a second angled wall.

6. The seal disk assembly of claim 5, wherein the concave profile further comprises a plurality of straight wall sections.

7. The seal disk assembly of claim 5, wherein the seal disk comprises a resilient sealing material, and the disk housing comprises a rigid material.

\* \* \* \* \*